July 9, 1940.  A. BOYNTON  2,206,873
LEAKLESS RIGHT AND LEFT TOOL JOINT
Filed Oct. 28, 1938
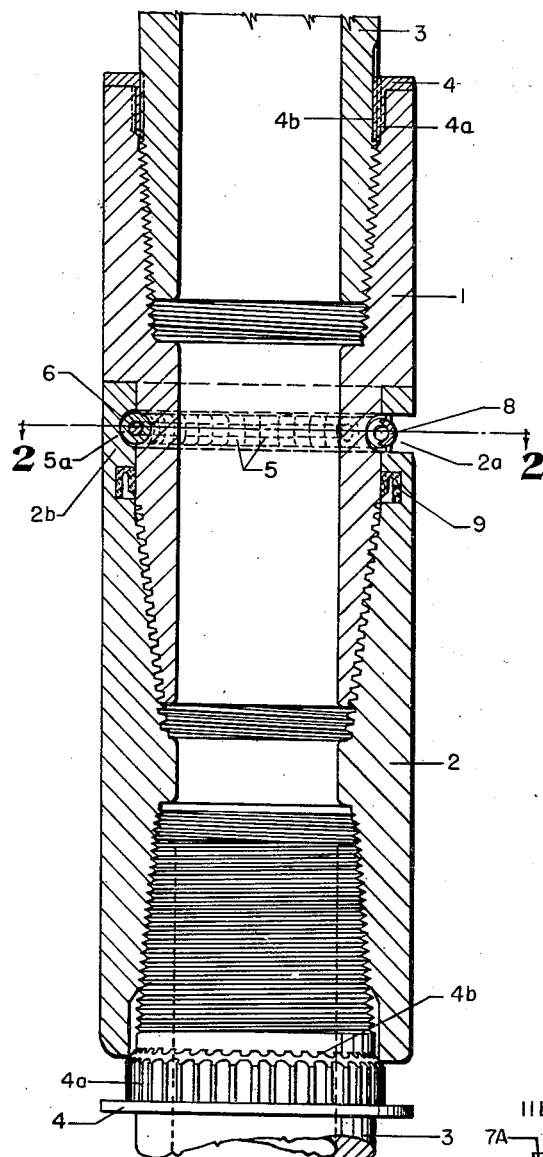
Fig. 1.
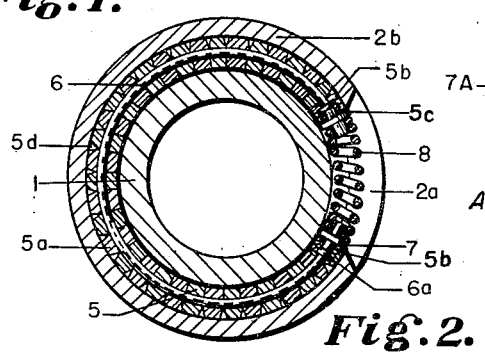
Fig. 2.
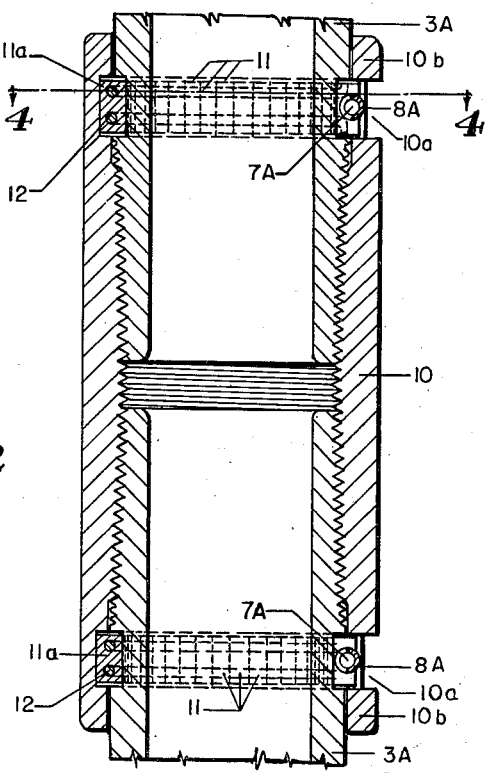
Fig. 3.
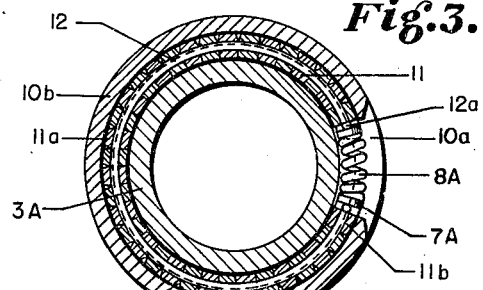
Fig. 4.
Fig. 5.
Fig. 6.
ALEXANDER BOYNTON, INVENTOR,
BY Jesse P. Stone
Lester B. Clark
ATTORNEYS Patented July 9, 1940

2,206,873

UNITED STATES PATENT OFFICE 2,206,873

LEAKLESS RIGHT AND LEFT TOOL JOINT

Alexander Boynton, San Antonio, Tex.

Application October 28, 1938, Serial No. 237,526

5 Claims. (Cl. 285—146)

My invention relates primarily to improvements in tool joints for drill stems used in rotary well drilling.

The objects of my invention are: (1) To prevent leakage of pump fluid between the threads and abutting surfaces of the box and pin members of the tool joint, (2) to provide a locking means which prevents the tool joint from becoming accidentally unscrewed, and, (3) to provide that the drill stem may be rotated in drilling either clockwise or anti-clockwise without becoming disconnected.

Leakage is prevented by a hydraulically expanded cup which seals off when the pump is started. The locking, which prevents accidental unscrewing and which permits the drill stem to be rotated in both directions, is accomplished by a jointed rod removably fitted into mating halves of a circular opening between adjacent portions of the box and pin members.

I attain the foregoing objects by mechanism illustrated in the accompanying drawing in which—

Fig. 1 is a longitudinal section through a tool joint showing my improvements.

Fig. 2 is a cross section on the line 2—2, Fig. 1.

Fig. 3 is a longitudinal section through a modified form of the invention disclosed in Fig. 1, adapted for a drill pipe coupling.

Fig. 4 is a cross section on the line 4—4, Fig. 3.

Fig. 5 is a top view of the rectangular thread locking jointed rod assembly 11, Fig. 3.

Fig. 6 is mainly a side view of the assembly shown in Fig. 5, a portion of one end being shown in section.

Similar characters of reference refer to similar parts throughout the several views of each embodiment.

In Fig. 1 tool joint pin end 1 is shown threadedly joined to tool joint box end 2, as is customary. The annular extension 2b has an internal circular recess into which is fitted a U-cup 9, which may be of leather or any other tough, durable substance, adapted to be expanded against the members 1 and 2 by fluid pressure escaping upward between the threads below it. Obviously, any other sealing-off means, such as V-packing, may be substituted for the U-cup 9, and more than one of them may be employed if necessary.

Two oppositely positioned grooves, one upon the exterior surface of the member 1 and the other upon the internal surface of the extension 2b, form a circular annular opening within which the jointed rod 5 has sliding engagement. The joints or segments 5a, having openings 5d between them to allow the assembly to be bent without impinging one segment upon the other, as appears in Fig. 2, are assembled upon a wire 6 having each end enlarged by annealing and bradding, as shown at 6a, Fig. 2.

Each end segment 5b has a threaded opening 5c in its outer end. The opening 2a, Figs. 1 and 2, is so formed that the jointed assembly may be inserted endwise, as appears in Fig. 2, where it is shown secured against working out by the coiled spring 8 and spring connections 7, each of which latter members has one end engaged within the spring and the other end fitted within the threaded opening within the outer end of each end segments 5b. The jointed assembly, being properly lubricated, may be readily pushed in or withdrawn. For convenience in placing the jointed assembly, as appears in Fig. 2, or for withdrawing it, a tool similar to an ice pick with threads on the sharp end may be connected into the threaded ends of either end segment 5b. The ends of members 7 have a tight pressed in fit within the spring ends to prevent the members 7 from being lost in action as the jointed assembly is being manipulated into or out of the position shown in Fig. 2.

The drill pipe 3 has the usual threaded connection into each end of the tool joint, but in addition thereto, I have shown a thread locking means at 4, the upper one being pressed into position wherein the external keys 4a are engaged within the inner surface of the counterbored end of member 1 and the internal keys 4b are engaged within the outer surface of drill pipe 3.

All rotary thrust is taken by the jointed assembly 5 and the thread locking means 4 which thus relieve the threads of all strain and permits the pipe to be rotated in either direction without danger of becoming unscrewed.

Figs. 3, 4, and 6 illustrate a modified form of this invention wherein the coupling 10 is shown threadedly joined to drill pipe 3A and locked against unscrewing by another jointed rod assembly 11. The segments 11a are rectangular except for bevels 11d which allow the assembly to be bent without one segment impinging upon the other at the inner edges of their ends. Two wires 12 are received within openings through the segments, the wire ends being bent, as shown at 12a, to secure the jointed assembly.

Two mating recesses, one exterior of the pipe 3A and the other interior of annular extension 10b, are provided proximate each end of the coupling, as appears in Fig. 3. The jointed assemblies 11 have an easy sliding fit within these recesses into which they may be placed and from which they may be readily removed, as was stated for the somewhat similar assembly in Figs. 1 and 2. The coiled spring 8A has the members 7A pressed into either end.

The outer ends of members 7A are received within threaded openings at the outer ends of segments 11b, as appears in Fig. 4, for the purpose of preventing the jointed assembly from working out of position during the drilling operation. The openings 10a provide entrance places that the jointed assembly 11 may be inserted endwise, as appears in Fig. 4. The threaded opening 11c in the outer end of each end segment 11b is to engage a special tool for placing and removing the jointed assembly, such as was stated for the preferred form.

In operation it is apparent that the U-cup 9 would be expanded and seal off at the first stroke of the pump if there should be any leakage between the threads of the box and pin ends of the tool joint. It is also apparent that the jointed assemblies 5 in Fig. 1, and 11 in Fig. 3, would become impinged against the mating slots into which these assemblies fit, the moment an unscrewing movement should start while these jointed assemblies are in place.

I reserve the right to make such minor substitution of other parts for those shown and changes in construction as will remain within the scope of the stated objects and appended claims.

I claim:

1. A tool joint comprising threadably interconnected pin and box members, complementary grooves in said members forming an annular recess between the members, and locking means within said recess restraining the members from relative rotation, said last mentioned means comprising a series of rockable segments, each segment having a diagonal dimension greater than the radial dimension of the recess.

2. A tool joint comprising threadably interconnected pin and box members, grooves in said members forming an annular recess between the members, an opening through the wall of one of the members from the groove therein, and locking means within said recess insertable into and withdrawable from the recess through said opening, said locking means comprising rockable segments adapted to engage the walls of the recess and lock the members against relative rotation.

3. A pipe connection comprising threadably interconnected members, complementary grooves in said members forming an annular recess therebetween, and a segmented locking member within said recess, said locking member being so constructed and arranged that the segments thereof are adapted to rock within the recess to engage the walls of the recess and prevent relative rotation of the members.

4. A pipe connection comprising coaxial tubular members having telescopic portions, opposing grooves in said telescopic portions forming an annular recess between the members, and locking means within said recess to restrain the members from relative rotation, said locking means comprising a plurality of segments fitting within the recess and rockable therein to engage the walls thereof and lock the members against relative rotational movement.

5. A pipe connection comprising coaxial tubular members having telescopic portions, opposing grooves in said telescopic portions forming an annular recess between the members, and locking means within said recess to restrain the members from relative rotation, said locking means comprising a segmented member of which the segments are adapted to rock and engage the opposing walls of the recess.

ALEXANDER BOYNTON.